United States Patent [19]

Kato et al.

[11] Patent Number: 5,085,911
[45] Date of Patent: Feb. 4, 1992

[54] FLEXIBLE MAGNETIC DISC WITH A TWO LAYER PROTECTIVE COATING WHICH TOP LAYER IS A ULTRA VIOLET RADIATION CURED COMPOUND WITH SPECIFIED ELASTICITY MODULUS

[75] Inventors: Mikihiko Kato; Yasushi Endo; Toshio Kawamata, all of Kanagawa, Japan

[73] Assignee: Fuji Photo Film Co., Ltd., Kanagawa, Japan

[21] Appl. No.: 536,859

[22] Filed: Jun. 12, 1990

[30] Foreign Application Priority Data

Jun. 13, 1989 [JP] Japan ............................. 1-150266
Mar. 7, 1990 [JP] Japan ............................. 2-55848

[51] Int. Cl.$^5$ ............................................. G11B 23/00
[52] U.S. Cl. ............................................. 428/65; 428/64; 428/694; 428/900; 428/212; 428/323; 428/336; 428/480; 428/9; 360/133; 360/135; 427/44; 427/54.1; 427/128; 427/129; 427/130
[58] Field of Search .................... 428/64, 65, 694, 900, 428/212, 323, 424.6, 336, 480; 360/133, 135; 427/128, 129, 130, 44, 54.1

[56] References Cited

U.S. PATENT DOCUMENTS

| | | | |
|---|---|---|---|
| 4,326,001 | 4/1982 | Sachs et al. | 428/161 |
| 4,578,299 | 3/1986 | Kato et al. | |
| 4,581,270 | 4/1986 | Kato et al. | |
| 4,652,480 | 3/1987 | Kato et al. | |
| 4,671,978 | 6/1987 | Kato et al. | |
| 4,696,846 | 9/1987 | Kato et al. | |
| 4,699,835 | 10/1987 | Takeuchi et al. | 428/65 |
| 4,721,640 | 1/1988 | Kato et al. | |

Primary Examiner—Merrell C. Cashion, Jr.
Assistant Examiner—Steven A. Resan
Attorney, Agent, or Firm—Sughrue, Mion, Zinn, Macpeak & Seas

[57] ABSTRACT

A novel flexible magnetic disc is provided comprising a protective layer on the periphery of a central hole, wherein the protective layer comprises of two layers, the lower one of the two layers being a composition mainly composed of a printing ink and the upper one being a composition mainly composed of a resin obtained by irradiating a radiation-polymerizable compound with radiation so that it cures.

8 Claims, 1 Drawing Sheet

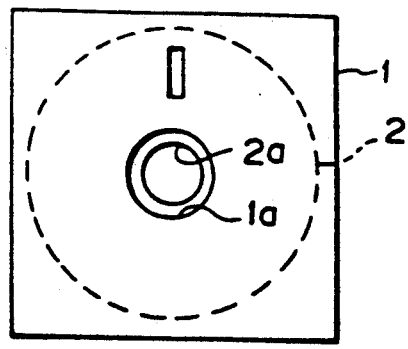
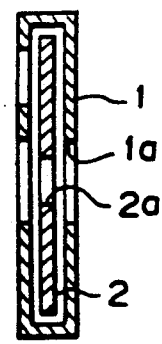
Fig. 1A  Fig. 1B
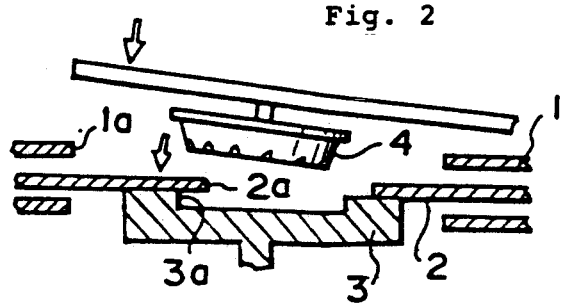
Fig. 2
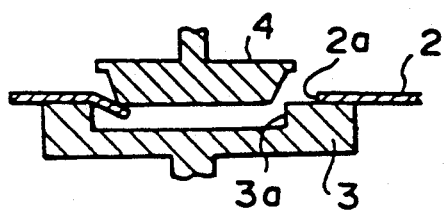
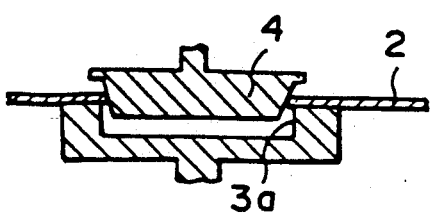
Fig. 3  Fig. 4
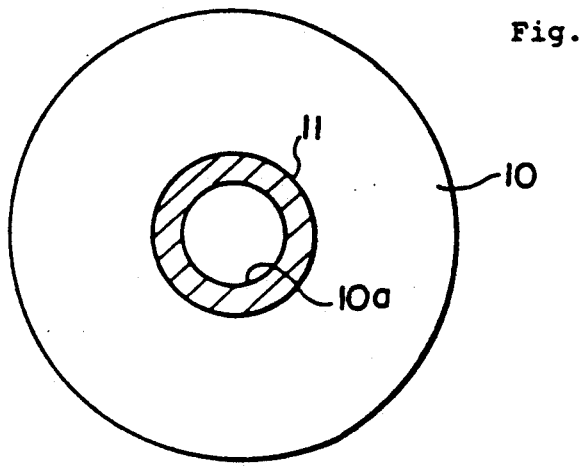
Fig. 5

FLEXIBLE MAGNETIC DISC WITH A TWO LAYER PROTECTIVE COATING WHICH TOP LAYER IS A ULTRA VIOLET RADIATION CURED COMPOUND WITH SPECIFIED ELASTICITY MODULUS

FIELD OF THE INVENTION

The present invention relates to flexible magnetic discs, and more particularly to a flexible magnetic disc capable of being mounted on a writing/reading apparatus without being eccentric thereto.

BACKGROUND OF THE INVENTION

A magnetic disc sheet has been heretofore known which is adapted to be housed in a jacket and engaged with a sheet positioning member for a writing/reading apparatus at a central hole provided in both the jacket and the sheet so that when it is rotated by the sheet positioning member, magnetic recording is effected on the sheet or magnetic reproduction is effected from the sheet. Since this kind of a magnetic disc sheet is housed in a jacket with some margin, it may get out of position in the jacket in storage, handling or carriage, causing the central hole of the sheet to be eccentric to the position of the positioning member (collet) in the writing/reading apparatus when mounted in the writing/reading apparatus. This may cause the disc sheet to be held in an eccentric position when it is positioned.

FIGS. 1A and 1B illustrate this kind of a flexible magnetic sheet. In a rectangular jacket 1 having a circular opening 1a at the central portion thereof, a flexible magnetic sheet 2 is rotatably housed with the periphery of its central hole 2a exposed in the central circular opening 1a.

When this flexible magnetic disc is mounted in the writing/reading apparatus, the collet 4 is lowered down and pressed into a circular concavity 3a of a rotary portion 3 of the positioning member with the rotary portion 3 held to the bottom surface of the sheet 2, as shown in FIG. 2. The periphery of the central hole 2a of the sheet 2 does not necessarily coincide in position with the circular concavity 3a of the rotary portion 3 and may often get out of position. If the collet 4 is lowered down in such a situation, part of the periphery of the circular hole 2a of the sheet 2 is caught in between the collet 4 and the concavity 3a of the rotary portion 3 as illustrated by FIG. 3, causing the sheet 2 to rotate eccentrically. When the magnetic disc sheet 2 does not keep rotating with its center coinciding with the rotary axis, writing and reading cannot be properly conducted. Therefore, the magnetic disc sheet should be prevented from being held in such an eccentric position. Furthermore, if the magnetic disc sheet is held and rotated in such an eccentric position, it may lose flatness, causing shaky rotation. In order to properly mount the sheet 1 as shown in FIG. 4 (rather than FIG. 3) when the collet 4 is lowered down to clamp the sheet 2, it is necessary that the periphery of the central circular hole of the sheet has a proper rigidity and the coefficient of friction ($\mu$) of the sheet 2 with the collet 4 and the rotary portion 3 be small.

To this end, JP-A-57-113,422, 60-22,785 and 60-25,074 (the term "JP-A" as used herein means an "unexamined published Japanese patent application") disclose an approach which comprises providing a protective layer comprising an ultraviolet-polymerizable polyolefin material and an aliphatic ester on a portion of the periphery of the central circular hole of a flexible magnetic disc with which the sheet-positioning member is brought into contact to reduce the, coefficient of friction therebetween.

However, such a protective layer merely composed of an ultraviolet-curing resin leaves much to be desired. In particular, if flexible magnetic discs are piled up with such protective layers brought into contact with each other during preparation, these protective layers may become glued to each other to cause blocking due to its flatness or softness.

If a flexible magnetic disc has been clamped in a floppy disc drive under the circumstances of high humidity and temperature over an extended period of time, such a protective layer may adhere to the rotary portion or the collet.

In order to overcome this problem, the resin to be contained in the protective layer may be hardened or may be mixed with a filler as disclosed in JP-A-60-234,273.

However, if the resin is hardened, its adhesion to the magnetic layer on the flexible magnetic disc is lowered, possibly causing the protective layer to fall off during use. If the resin contains a filler, the filler often absorbs ultraviolet light, preventing the resin from thoroughly curing.

An approach which comprises using an epoxy resin, synthetic rubber or the like as a ultraviolet-curing resin for the protecive layer is disclosed in JP-B-U-57-28,298 (the term "JP-B-U" as used herein means an "examined Japanese utility model publication"). However, even by this approach, it is still difficult to attain an excellent adhesion to the magnetic layer while inhibiting the adhesion between the protective layers. A protective layer composed of such a resin is also disadvantageous in that it is liable to be damaged.

SUMMARY OF THE INVENTION

It is therefore an object of the present invention to provide a flexible magnetic disc which exhibits a small coefficient of friction with a positioning member and thus can be mounted in a writing/reading apparatus without being eccentric thereto and does not stick to each other when piled up on one another.

The above and other objects of the present invention will become more apparent from the following detailed description and examples.

These objects of the present invention are accomplished with a flexible magnetic disc comprising a protective layer on the periphery of a central hole, wherein said protective layer comprises two layers, the lower one of said two layers being a composition mainly composed of a printing ink and the upper one being a composition mainly composed of a resin obtained by irradiating a radiation-polymerizable compound with radiation so that it cures.

BRIEF DESCRIPTION OF THE DRAWINGS

FIG. 1A is a plan view illustrating an example of a flexible magnetic disc;

FIG. 1B is a section of FIG. 1A;

FIG. 2 is a partially sectional view illustrating how a flexible magnetic disc is mounted in a positioning apparatus in a writing/reading apparatus;

FIG. 3 is a partially sectional view illustrating a sheet held eccentric to the writing/reading apparatus;

FIG. 4 is a partially sectional view illustrating a sheet properly positioned; and FIG. 5 is a plan view illustrating a flexible magnetic disc sheet according to the present invention.

DETAILED DESCRIPTION OF THE INVENTION

The present flexible magnetic disc comprises a protective layer generally having the width of 1.5 to 5 mm and preferably 2.0 to 3.5 mm provided on the periphery of its central hole. The protective layer comprises two layers. Since the upper one of the two layers is a composition mainly composed of a resin obtained by irradiating a radiation-polymerizable compound with radiation so that it cures, the upper layer exhibits a great hardness which gives a small coefficient of friction with the flexible magnetic disc positioning member. Thus, it is less likely that the flexible magnetic disc is eccentrically mounted in the drive. Furthermore, since the lower layer is a composition mainly composed of a printing ink, the upper layer has a higher adhesion to the flexible magnetic disc than the case where the upper layer is directly provided on the flexible magnetic disc, preventing the falling-off of the protective layer which causes an increase in drop out. Moreover, since the lower layer serves as a cushioning medium, the protective layers do not stick to one another when a plurality of the flexible magnetic discs are piled up and are less liable to be damaged unlike the case where the protective layer consists of the upper layer alone.

The lower layer of the protective layer of the present invention is formed of a composition comprising a printing ink provided on a nonmagnetic support by a proper printing means. It goes without saying that such a printing ink can be properly printed on the non-magnetic support. When such a printing ink is printed on the non-magnetic support by a proper printing means to form a lower layer, its proper viscosity, coverability and fluidity facilitate the formation of a film. Since the lower layer film thus formed has an excellent dryability, the upper layer can be formed in a short period of time after the formation of the lower layer. Since the lower layer thus formed exhibits excellent durability and adhesion, the protective layer does not easily fall off. Furthermore, since such a printing ink can take any color from a pigment, the protective layer thus formed makes the flexible magnetic disc fashionable. Thus, the objects of the present invention can be effectively accomplished.

The above mentioned printing ink is not specifically limited. As the printing ink there can be any type of a printing ink for letterpress printing, lithography, intaglio printing, gravure printing or the like. The printing ink comprises a pigment and a vehicle. Examples of the film-forming component to be contained in the vehicle include various drying oils, semidrying oils, drying oil-modified resins, semidrying oil-modified resins, oil-soluble phenolic resins, alkyd resins, and other various synthetic resins. Particularly preferred among these compounds are vinyl chloride resins, polyester resins, polyethylene resins, drying oils, semidrying oils, drying oil-modified resins, and semidrying oil-modified resins. These resins are excellent in dryability during the formation of film and in adhesion. These resins also can improve the adhesion of the upper layer provided thereon.

As above noted, the present flexible magnetic disc is also advantageous in that various coloring particles can be selectively used as particulate pigment for the lower layer of the protective layer to make the disc fashionable and distinguishable.

The present flexible magnetic disc is further advantageous in that a particulate matting agent can be incorporated in the upper layer of the protective layer to further lower the coefficient of friction of the protective layer with the positioning member in the drive.

Furthermore, since it is not necessary that the upper layer comprise any ultraviolet-absorbing substance such as a filler, the curing of an ultraviolet-curing compound can proceed to a sufficient degree. This provides a protective layer exhibiting a high surface hardness, that makes it less liable to be damaged, exhibits a small coefficient of friction, and is not likely adhered to one another. The protective layer thus formed furthers the various advantages of the present flexible magnetic disc.

The radiation-polymerizable compound which can be incorporated in the upper layer of the protective layer is a compound containing at least one unsaturated bond in its molecule, particularly compounds having one or more carbon-carbon unsaturated bonds such as an acryloyl group, acrlylamido group, allyl group or the like, vinyl compounds, compounds ether-bonded to a vinyl moiety, thiovinyl moiety or the like, or an unsaturated polyester. Examples of such a compound having one unsatuated bond are alkyl acrylates (e.g., methyl acrylate), styrene and derivatives thereof (e.g., α-methylstyrene and β-chlorostyrene), acrylonitrile, vinyl acetate, and vinyl propionate. Example of compounds containing two or more unsaturated bonds are those disclosed in *Kankosei Jushi Data Rui*(Data of Light-sensitive Resins), pp. 235-236, published by Sogo Kagaku Kenkyusho, December 1968. Particularly preferred among these compounds are unsaturated esters of polyol such as ethylene diacrylate, diethylene diglycol diacrylate, glycerol triacrylate, ethylene diacrylate and pentaerythritol tetraacrylate, and glycidyl acrylate containing epoxy ring. Compounds containing one unsaturated bond per molecule and those containing two or more unsaturated bonds per molecule can be used in admixture.

These compounds may be high molecular weight compounds. Particularly preferred among these comppounds are compounds containing ester bonds to acrylic acid at the terminal of main chain or at side chains in its molecule. These compounds are described in A. Vrancken, *Fatipec Congress*, 11 19, 1972. One example of these compound is a compound represented by the following formula:

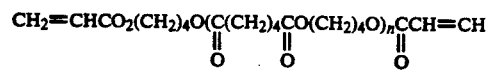

wherein the polyester skeleton may be replaced with a polyurethane skeleton, epoxy resin skeleton, polyether skeleton, polycarbonate skeleton or a mixture thereof. Two or more kinds of such molecules can be used in admixture. The molecular weight of such a compound is preferably in the range of 1,000 to 20,000 but is not specifically limited. As an electron beam-polymerizable compound there can be used a mixture of the above mentioned monomers and polymers.

The term "radiation" as used herein means ultraviolet light as low energy radiation or α-ray, X-ray or electron beam as high energy radiation. Particularly preferred among these radiations is ultraviolet light, which can be generated by a simple generator.

When ultraviolet light is used as radiation, an aromatic ketone is preferably incorporated as a photopolymerization initiator in the system. Such an aromatic ketone is not specifically limited but preferably exhibits a relatively great absorptivity coefficient at wavelengths of 254 nm, 313 nm and 365 nm, at which line spectrum is generated by a mercury vapor lamp commonly used as an ultraviolet radiation source. Typical examples of such an aromatic ketone include acetophenone, benzophenone, benzoin ethyl ether, benzyl methyl ketal, benzyl ethyl ketal, benzoin isobutyl ketone, hydroxy dimethyl phenyl ketone, 1-hydroxycyclohexyl phenyl ketone, 2,2-diethoxy acetophenone, and Michlers' ketone Thus, various aromatic ketones can be used.

The mixing proportion of the aromatic ketone, is in the range of 0.5 to 20 parts by weight, preferably 2 to 15 parts by weight, more preferably 3 to 10 parts by weight, based on 100 parts by weight of the radiation-polymerizable compound.

As the vehicle component to be incorporated in the printing ink constituting the lower layer of the protective layer, there can be used any type of drying oil or semidrying oil. In particular, there can be used a vegetable oil having an iodine value of 130 or more or oil synthesized therefrom.

Examples of such an oil include linseed oil, Chinese tung oil, perilla oil, soybean oil, dehydrated castor oil, rosin, maleinated oil, styrenated oil, and urethanated oil.

Examples of drying oil-modified resin and semidrying oil-modified resin include modifed alkyd resin, modified phenolic resin, rosin ester, and maleic resin.

The content of the above mentioned drying oil, semidrying oil, drying oil-modified resin or semidrying oil-modified resin is preferably in the range of 30 to 80% by weight based on the total weight of the composition for the lower layer. If this content is too small, the lower layer composition exhibits a high viscosity which deteriorates its coating performance. If this content is too large, the coloring with a pigment leaves much to be desired.

Other examples of vehicle components to be contained in the printing ink include synthetic resins such as vinyl chloride resin, polyester resin and polyethylene resin. These resins can form a film with a high strength and which exhibits an excellent dryability during the formation of film. These resins are preferably used in an amount of 30 to 80% by weight, more preferably 40 to 60% by weight based on the total weight of the composition for the lower layer.

As particulate pigment to be contained in the printing ink constituting the lower layer composition, there can be used any type of an inorganic or organic pigment which has been heretofore used in the art of coating and printing ink. Examples of such an organic pigment include Hansa Yellow, Pyrazolone Orange, Brilliant Fast Scarlet, Pyrazolone Red B, Lithol Red R, Lake Red C, Brilliant Carmine 6B, Rhodamine 6G Lake, and phthalocyanin pigment. Examples of such an inorganic pigment include titanium oxide, zinc white, barium sulfate, chrome yellow, carbon black, molybdenum red, red oxide, chromium oxide, alumina, Prussian blue, and ultramarine blue.

The particle diameter of the particulate pigment of the present invention is preferably in the range of 0.01 to 5 $\mu$m. If the particle diameter of the present particulate pigment is too large, the pigment exhibits a reduced hiding power. If the particle diameter of the present particulate pigment is too small, the particulate pigment does not undergo dispersion sufficiently, causing a problem.

The content of the particulate pigment in the lower layer composition is preferably in the range of 10 to 70% by weight.

In particular, the above mentioned particulate pigment is added to the vehicle component, and the mixture is then subjected to dispersion by a proper conventional kneading means to obtain a uniform composition. In order to enhance its coloring effect, the particulate pigment needs to be thoroughly finely dispersed in the system.

The upper and lower layers of the protective layer can be coated on the periphery of the central circular hole of the present flexible magnetic disc by any suitable means. Examples of such printing means which can be used in the present invention include gravure printing, silk screen printing, flexographic printing, letterpress printing, dry offset process, and pad application.

Since the above mentioned lower layer composition of the present flexible magnetic disc can dry in a relatively short period of time after being coated to form a strong film and the adhesion of the above mentioned upper layer to the magnetic layer can be raised, a flexible magnetic disc which is free from falling-off of the protective layer, which causes an increase in drop out while in use.

The total thickness of the above mentioned protective layer is in the range of 2 to 30 $\mu$m, preferably 3 to 20 $\mu$m and more preferably 6 to 10 $\mu$m. If the total thickness of the protective layer is too small, the printing of the protective layer is difficult, and its hiding power is lowered. If the total thickness of the protective layer is too large, it takes much time for both the upper and lower layers to dry, and the effect of the particulate matting agent as described below is reduced. The thicknesses of the upper layer and the lower layer can be properly selected, and generally 1 to 20 $\mu$m and 1 to 20 $\mu$m and preferably 4 to 15 $\mu$m and 2 to 10 $\mu$m, respectively.

A particulate matting agent can be incorporated in the upper layer to roughen the surface thereof so that the coefficient of friction between the protective layer and the positioning member in the drive can be further reduced.

As such particulate matting agent there can be used finely divided particles of various inorganic or organic matters.

Examples of finely divided inorganic particles include zinc oxide, nickel oxide, titanium oxide, silicon oxide, barium sulfate, talc, kaolin, chromium oxide, cadmium sulfide, goethite, alumina, and calcium carbonate. Particularly preferred among these inoranic materials are silicon oxide and alumina. The surface of these finely divided inorganic materials can be treated with an organic matter to reduce their coefficient of friction. Examples of finely divided organic particles include powders of acetyl cellulose, polyethylene, polypropylene, polystyrene, thermoplastic polyester, polyamide, polyacrylonitrile, polyacetal resin, and thermosetting high molecular compounds such as phenolic resin, urea resin, triazine resin, melamine resin, epoxy resin, furan resin, and acrolein resin. These resins are preferably insoluble in the radiation-curing compound and organic solvent to be used in combination there-with. Paticularly preferred among these resins are urea resin and furan resin. If these finely divided particles are coated in the form of dispersion in a resin, their optimum particle diameter depends on the thickness of the upper layer. For example, if the thickness of the upper layer is 5 μm, the average particle diameter is in the range of 0.1 to 10 μm, preferably 1 to 10 μm, more preferably 2 to 8 μm. The upper and lower limits of the particle diameter increase as the thickness of the protective layer increases.

If a particulate matting agent is incorporated in the upper layer, its content is in the range of 1 to 50% by weight, preferably 5 to 30% by weight, more preferably 10 to 30% by weight based on the total weight of the upper layer composition. The upper layer may further comprise various lubricants.

Examples of such lubricants include $C_{6-22}$ saturated and unsaturated monobasic aliphatic acids, aliphatic esters made of $C_{6-22}$ saturated and unsaturated monobasic aliphatic acids and $C_{3-22}$ monovalent alcohols, alkoxy compounds thereof ($-OC_nH_{2n+1}$ in which n is an integer 1 to 6), $C_{5-25}$ aliphatic amides, higher alcohols, silicone oils, mineral oils, vegetable oils, and fluorine compounds. Thus, lubricants which are commonly used in the preparation of magnetic recording medium can be used.

The amount of the lubricant to be incorporated is in the range of 0.1 to 20 parts by weight, preferably 1 to 15 parts by weight, more preferably 3 to 10 parts by weight based on 100 parts by weight of the above mentioned radiation-polymerizable compound.

Examples of organic solvents for the coating solution of the upper and lower layer composition include ketones such as acetone, methyl ethyl ketone, methyl isobutyl ketone, and cyclohexanone, alcohols such as methanol, ethanol, propanol, and butanol; esters such as methyl acetate, ethyl acetate, butyl acetate, ethyl lactate, and glycol monoethyl ether acetate; glycol ethers such as ether, glycol dimethyl ether, glycol monoethyl ether, and dioxane; tars (aromatic hydrocarbon) such as benzene, toluene, and xylene; methylene chloride, ethylene chloride, carbon tetrachloride, chloroform, ethylene chlorohydrin, dichlorobenzene, and fluorine-containing solvents.

The elasticity modulus of the upper layer is preferably in the range of $1 \times 10^{-7}$ to $1 \times 10^{-11}$ kg/mm$^2$, more preferably $1 \times 10^{-8}$ to $5 \times 10^{-10}$ kg/mm$^2$, most preferably $1 \times 10^{-9}$ to $5 \times 10^{-10}$ kg/mm$^2$. If the elasticity modulus of the upper layer is too low, the upper layer is more subject to adhesion to the spindle of the drive. If this value is too high, the upper layer becomes brittle and thus subject to flaw.

In accordance with the present invention, the protective layer provided on the periphery of the central circular hole comprises two layers, the lower one of said two layers being a composition mainly composed of a printing ink and the upper one being a composition mainly composed of a resin obtained by irradiating a radiation-polymerizable compound with radiation so that it cures, whereby a flexible magnetic disc can be obtained which exhibits a small coefficient of friction with the positioning member, making the protective layer insusceptible to falling-off which causes an increase in drop out while in use, and the discs are not adhered to one another when piled up.

Furthermore, the present flexible magnetic disc can be made fashionable and discriminative.

The present invention will be further described in the following Examples and Comparative Examples, which are none limiting. In the Examples and Comparative Examples, all parts are by weight.

EXAMPLE 1

A protective layer 11 of the present invention was formed on both sides of the periphery of a central circular hole 10a of a flexible magnetic disc 10 shown in FIG. 5 as follows.

| Coating solution for composition of lower layer of protective layer | |
|---|---|
| Linseed oil varnish | 100 parts |
| Titanium oxide (mean particle diameter: 0.2 μm) | 40 parts |
| Coating solution for composition of upper layer of protective layer | |
| Polyurethane acrylate (M-1100, available from Toa Gosei Chemical Industry Co., Ltd.) | 100 parts |
| SiO$_2$ powder (mean particle diameter: 4 μm) | 20 parts |
| Benzoyl ethyl ether | 5 parts |
| Butyl stearate | 5 parts |

The above mentioned coating solution for the lower layer was printed on one side of the periphery of the central circular hole of the flexible magnetic disc to a thickness of 4 μm in a letterpress process, and the above mentioned coating solution for the upper layer was then immediately printed thereon to a thickness of 3 μm in a letterpress process.

The coat was then irradiated with ultraviolet light with a strength of 80 W/cm$^2$ from a high-voltage mercury vapor lamp so that the upper layer composition underwent polymerization and curing to form a protective layer.

A protective layer was then formed on the other side of the periphery of the central circular hole of the flexible magnetic disc in the same manner.

EXAMPLE 2

A protective layer was formed on both sides of the periphery of the central circular hole of the flexible magnetic disc in the same manner as in Example 1, except that the coating solution for the upper layer of the protective layer was replaced by the following composition.

| Coating solution for composition of upper layer of protective layer | |
|---|---|
| Polyurethane acrylate (M-1100, available from Toa Gosei Chemical Industry Co., Ltd.) | 100 parts |
| Trimethylol propane acrylate | 30 parts |
| Benzoyl ethyl ether | 5 parts |
| Butyl stearate | 5 parts |

COMPARATIVE EXAMPLE 1

A protective layer was formed on both sides of the periphery of the central circular hole of the flexible magnetic disc in the same manner as in Example 1, except that the protective layer consisted of the upper layer alone.

COMPARATIVE EXAMPLE 2

A protective layer was formed on both sides of the periphery of the central circular hole of the flexible magnetic disc in the same manner as in Example 2, except that the protective layer consisted of the upper layer alone.

COMPARATIVE EXAMPLE 3

No protective layer was formed on the periphery of the central circular hole of the flexible magnetic disc.

EXAMPLE 3

A protective layer 11 was formed on both sides of the periphery of the central circular hole 10a of the flexible magnetic disc sheet 10 in the same manner as in Example 1, except that the coating solution for the lower layer composition was replaced by the following composition.

| Coating solution for composition of lower layer of protective layer | |
|---|---|
| Type R printing ink (available from Tanpo Print K.K.) | |
| Vehicle: | vinyl chloride, polyethylene and polyester resin |
| Pigment: | titanium oxide |
| Vehicle/pigment proportion: | 100/40 (by weight) |

These flexible magnetic disc specimens thus obtained were measured for coefficient of friction and subjected to test for mountability in a disc drive at a temperature of 25° C. and a relative humidity of 80%. The results are set forth in Table 1.

For the measurement of coefficient of friction, the positioning member (collet) was rubbed with the magnetic sheet at a feed rate of 0.8 mm/sec under the load of 70 g. The measurement of coefficient of friction with the rotary portion of the positioning member was similarly conducted.

The drives used for the test for mountability in the disc drive were YD-280 and 380 available from Y-E Data K.K., JA751 and 561 available from Matsushita Communication Industry Co., Ltd., and M-2894 and 4853 available from Mitsubishi Electric Corp.

For this test, the disc specimens were repeatedly mounted in these drives ten times. In the table, E indicates a disc specimen which showed no defects on all these drives, and P indicates a disc specimen which showed defects on one or more drives.

The percentage adhesion to the disc drive at a temperature of 40° C. and a relative humidity of 80% is set forth in Table 1. The drive used in this measurement was YD-480 available from Y-E Data K.K. For this measurement, the adhesion to the rotary portion was observed after 12 hours of continuous clamping under these conditions. The percentage adhesion was calculated by dividing the number of disc specimens which adhered to the rotary portion by the number of disc specimens tested and multiplying it by 100. The results are set forth in Table 1.

Ten sheets of each flexible magnetic disc specimen were piled up under the load of 1 kg. Thereafter, the number of flexible magnetic discs which had been adhered to each other was then determined. The results are set forth in Table 1.

TABLE 1

| | Measurement condition | | | | |
|---|---|---|---|---|---|
| | 25° C., 80% RH | | 40° C., 80% RH | | |
| | Item measured | | | | |
| | Coefficient of friction | | | | Number of discs |
| Example of protective layer | with collet | with rotary portion | Mount-ability test | Adhesion to disc drive | adhered to each other |
| Example 1 | 0.33 | 0.23 | E | 0 | 0 |
| Example 2 | 0.34 | 0.24 | E | 0 | 0 |
| Comparative Example 1 | 0.34 | 0.25 | E | 80 | 3 |
| Comparative Example 2 | 0.34 | 0.26 | E | 70 | 7 |
| Comparative Example 3 | 0.50 | 0.43 | P | 0 | 0 |
| Example 3 | 0.32 | 0.25 | E | 0 | 0 |

As shown in Table 1, Comparative Specimens 1 and 2 exhibit substantially the same level of friction coefficient as the present specimens and an excellent mountability in the disc drive but showed adhesion to the disc drive. In the piling-up test, some sheets were observed adhered to each other in Comparative Examples 1 and 2.

These flexible magnetic disc specimens were repeatedly mounted and detatched from YD-380 available from Y-E Data K.K. at a temperature of 25° C. and a relative humidity of 50% 50,000 times. Thereafter, the flexible magnetic disc specimens were observed for falling-off and scratch on the protective layer. A double-coated adhesive tape was put on the protective layer and then peeled off at an angle of 180° to determine adhesion of the protective layer. The results are set forth in Table 2.

TABLE 2

| | Repeated Mounting and detatchment over 50,000 times | | |
|---|---|---|---|
| Example No. | Falling-off of protective layer | Scratch | Adhesion |
| Example 1 | None | No scratch | No peeling under 1,000 g |
| Example 2 | None | No scratch | No peeling under 1,000 g |
| Comparative Example 1 | Partially falls off | Small scratch | Peeling observed under 800 g |
| Comparative Example 2 | Partially falls off | Medium scratch | Peeling observed under 900 g |
| Comparative Example 3 | Magnetic layer falls off | Large scratch | — |
| Example 3 | None | No scratch | No peeling under 1,000 g |

While the invention has been described in detail and with reference to specific embodiments thereof, it will be apparent to one skilled in the art that various changes and modifications can be made therein without departing from the spirit and scope thereof.

What is claimed is:

1. A flexible magnetic disc comprising a protective layer on the periphery of a central hole, wherein said protective layer comprises two layers, the lower one of said two layers being a composition comprising a particulate pigment having a particle diameter in the range of from 0.01 to 5 μm and a vehicle selected from the group consisting of vinyl chloride resin, polyester resin and polyethylene resin, said vehicle being contained in an amount of 30 to 80% by weight based on the total weight of the composition for the lower layer, and the upper one being a composition comprising a resin obtained by irradiating an ultraviolet-curing compound with ultraviolet light so that it cures, said protective layer having a total thickness in the range of from 2 to 30 μm, and said upper layer having an elasticity modulus in the range of from $1\times10^{-7}$ to $1\times10^{-11}$ kg/mm².

2. A flexible magnetic disc as claimed in claim 1, wherein said upper layer comprises a particulate matting agent.

3. A flexible magnetic disc as claimed in claim 2, wherein said matting agent is contained in an amount of 1 to 50% by weight based on the total weight of the composition for the upper layer.

4. A flexible magnetic disc as claimed in claim 1, wherein said upper layer has the elasticity modulus of $1\times10^{-7}$ to $1\times10^{-11}$ kg/mm².

5. A flexible magnetic disc comprising a protective layer on the periphery of a central hole, wherein said protective layer comprises two layers, the lower one of said two layers being a composition comprising a particulate pigment having a particle diameter in the range of from 0.01 to 5 μm and a vehicle selected from the group consisting of a drying oil, a semidrying oil, a drying oil-modified resin and a semidrying oil-modified resin, said vehicle being contained in an amount of 30 to 30% by weight based on the total weight of the composition for the lower layer, and the upper one being a composition comprising a resin obtained by irradiating an ultraviolet-curing compound with ultraviolet light so that it cures, said protective layer having a total thickness in the range of from 2 to 30 μm, and said upper layer having an elasticity modulus in the range of from $1\times10^{-7}$ to $1\times10^{-11}$ kg/mm².

6. A flexible magnetic disc as claimed in claim 5, wherein said upper layer comprises a particulate matting agent.

7. A flexible magnetic discs as claimed in claim 4, wherein said matting agent is contained in an amount of 1 to 50% by weight based on the total weight of the composition for the upper layer.

8. A flexible magnetic disc as claimed in claim 5, wherein said upper layer has the elasticity modulus of $1\times10^{-7}$ to $1\times10^{-11}$ kg/m².

* * * * *